US012486609B2

(12) United States Patent

Ramon Mesa et al.

(10) Patent No.: US 12,486,609 B2

(45) Date of Patent: Dec. 2, 2025

(54) FLUID RECOVERY SYSTEMS FOR LAUNDRY SYSTEMS

(71) Applicant: Hamilton Sundstrand Corporation, Charlotte, NC (US)

(72) Inventors: Jorge Ramon Mesa, League City, TX (US); Luca Macarie, Naperville, IL (US); Daniel Doscher, Houston, TX (US); Kellie Phong, Houston, TX (US); Bjorner Ekre, League City, TX (US); Terrell L. Morrison, League City, TX (US); Dewey Louvier, Pearland, TX (US); John Guinn, League City, TX (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 453 days.

(21) Appl. No.: 17/963,952

(22) Filed: Oct. 11, 2022

(65) Prior Publication Data

US 2024/0117558 A1 Apr. 11, 2024

(51) Int. Cl.

*D06F 39/20* (2024.01)
*B64G 4/00* (2006.01)

(Continued)

(52) U.S. Cl.

CPC ............... *D06F 39/20* (2024.01); *B64G 4/00* (2013.01); *D06F 39/085* (2013.01); *D06F 39/10* (2013.01)

(58) Field of Classification Search

CPC ...... D06F 39/08; D06F 39/083; D06F 39/085; D06F 39/10; D06F 39/20; B64G 1/46; B64G 4/00

See application file for complete search history.

(56) References Cited

U.S. PATENT DOCUMENTS

| | | | | |
|---|---|---|---|---|
| 93,309 A | | 8/1869 | Jossee et al. | |
| 5,643,457 A | * | 7/1997 | Abramov ................ | B64G 1/60 210/668 |

(Continued)

FOREIGN PATENT DOCUMENTS

| | | | |
|---|---|---|---|
| CN | 102797133 A | 11/2012 | |
| CN | 104164773 A | 11/2014 | |

(Continued)

OTHER PUBLICATIONS

Machine Translation of Champeau, WO-9605352-A1, Feb. 1996. (Year: 1996).*

(Continued)

*Primary Examiner* — David G Cormier

(74) *Attorney, Agent, or Firm* — CANTOR COLBURN LLP

(57) ABSTRACT

A fluid recovery system for a laundry system (e.g., of a spacecraft) can include a main line having an inlet configured to fluidly communicate with a washing volume within an agitation chamber to receive washing fluid from the agitation chamber, a vacuum source in fluid communication with the main line to provide a partial vacuum to the inlet to cause washing fluid in the washing volume to at least partially evaporate, and a condenser disposed on the main line downstream of inlet. The condenser can be configured to receive evaporated washing fluid and to condense water in the evaporated washing fluid. The system can include a separator downstream of the condenser configured to separate water and laundry effluent gas, wherein the separator includes a water recovery output configured to output water for reuse.

18 Claims, 7 Drawing Sheets

(51) Int. Cl.
*D06F 39/08* (2006.01)
*D06F 39/10* (2006.01)

(56) References Cited

U.S. PATENT DOCUMENTS

| | | | |
|---|---|---|---|
| 5,749,250 | A | 5/1998 | Kim |
| 6,258,215 | B1 | 7/2001 | Samsonov et al. |
| 2007/0102276 | A1 | 5/2007 | Lubman et al. |
| 2015/0059414 | A1 | 3/2015 | Behbehani |
| 2019/0016620 | A1 | 1/2019 | Saslaw et al. |
| 2022/0098779 | A1 | 3/2022 | Coney et al. |
| 2024/0117556 | A1 | 4/2024 | Mesa et al. |

FOREIGN PATENT DOCUMENTS

| | | | | |
|---|---|---|---|---|
| CN | 105126298 | A | 12/2015 | |
| CN | 106811920 | A | 6/2017 | |
| CN | 106811922 | A | 6/2017 | |
| CN | 107794689 | A | 3/2018 | |
| CN | 108221263 | A | 6/2018 | |
| CN | 108708147 | A | 10/2018 | |
| CN | 110409101 | A | 11/2019 | |
| CN | 111501276 | A | 8/2020 | |
| CN | 212103359 | U | 12/2020 | |
| CN | 113274699 | A | 8/2021 | |
| DE | 806134 | C | 6/1951 | |
| WO | WO-9605352 | A1 * | 2/1996 | ........... D06F 43/086 |
| WO | 02072939 | A2 | 9/2002 | |

OTHER PUBLICATIONS

"Advertisement", Machine Design, Penton Media, Cleveland, OH, US, vol. 63, No. 8, Apr. 25, 1991, p. 36.
European Search Report for Application No. 23203078.3, mailed Feb. 7, 2024, 10 pages.
European Search Report for Application No. 23203080.9, mailed Feb. 15, 2024, 8 pages.
Machine Translation for CN110409101 (A), Published: Jun. 5, 2019, 10 pages.
Machine Translation for CN111501276 (A), Published: Aug. 7, 2020, 13 pages.
Machine Translation for CN212103359 (U), Published: Dec. 8, 2020, 9 pages.
Machine Translation for DE806134 (C), Published: Jun. 11, 1951, 3 pages.
Machine Translation of CN105126298 (A), Published: Dec. 9, 2015, 7 pages.
Machine Translation of CN106811920 (A), Published: Jun. 9, 2017, 11 pages.
Machine Translation of CN106811922 (A), Published: Jun. 9, 2017, 10 pages.
Machine Translation of CN107794689 (A); Published: Mar. 13, 2018, 13 pages.
"Get a load of this: NASA to test laundry detergent made for space" Posted: Jun. 22, 2021, [retrieved on Feb. 15, 2025]. Retrieved from the internet:, URL https://www.cbc.ca/news/science/nasa-laundry-detergent-space-1.6075627.
Cevis specifications, [retrieved on Feb. 15, 2025]. Retrieved from the internet:, URL https://www.danishaerospace.com/en/products-sep/cevis/cevis-specifications.
Cevis, [retrieved on Feb. 15, 2025]. Retrieved from the internet:,URLhttps://www.danishaerospace.com/en/products-sep/cevis.
Cuthbertson, "How Almost-Waterless Washers Are Using Beads to Help Save the Environment" Newsweek Magazine, Feb. 9, 2017 [retrieved on Feb. 15, 2025]. Retrieved from the internet:, URLhttps://www.newsweek.com/2017/02/17/almost-waterless-washers-use-beads-help-save-environment-554511.html.
International Exercise Countermeasures Hardware Catalog, International Countermeasures Working Group, Trieste, Italy, Jun. 2010, 41 pages.
Liberatore "NASA teams up with Tide to test how astronauts can wash their dirty laundry in space—with plans for celestial detergent, stain remover pens and even a moon based washer/dryer" [retrieved on Feb. 15, 2025]. Retrieved from the internet:, URL https://www.dailymail.co.uk/sciencetech/article-9714253/NASA-teams-Tide-test-astronauts-wash-dirty-laundry-space.html.
Shannon Palus, "There's No Laundry in Space, So NASA is Trying to Make Clothes That Don't Get Smelly" Jul. 14, 2014, [retrieved on Feb. 15, 2025]. Retrieved from the internet:, URL https://www.smithsonianmag.com/smart-news/there-no-laundry-space-nasa-works-reducing-astronaut-stench-2-180952031.
Vandewalle, et al. "Friction-loaded cycle ergometers: Past, present and future" rticle: 1029237 | Accepted Mar. 9, 2015, Published online: Apr. 13, 2015, [retrieved on Feb. 15, 2025]. Retrieved from the internet:, URL https://www.tandfonline.com/doi/full/10.1080/23311916.2015.1029237.
Welch, "NASA Glenn Interns Take Space Washing Machine Designs for a Spin" Jul. 29, 2021, [retrieved on Feb. 15, 2025]. Retrieved from the internet:, URLhttps://www.nasa.gov/centers-and-facilities/glenn/nasa-glenn-interns-take-space-washing-machine-designs-for-a-spin/.
Yirka, "Diffusiophoresis found to be critical factor for getting clothes clean" Mar. 23, 2018, [retrieved on Feb. 15, 2025]. Retrieved from the internet:, URL https://phys.org/news/2018-03-diffusiophoresis-critical-factor.html.
Zyga, et al. "Nearly Waterless Washing Machine to Debut in 2009" Jul. 29, 2008, [retrieved on Feb. 15, 2025]. Retrieved from the internet:,URLhttps://phys.org/news/2008-07-waterless-machine-debut.html.

* cited by examiner

100% Cotton Men's
Medium T-Shirt -
Stained with 5 mL
Coffee (top-left)

Baseline Test - Centrifuge
(10 mins) - 500 mL
Deionized Water & 15 mL
Tide Detergent Test (10 mins)
600 mL Tap Water & 15 mL
Tide Detergent

FLUID RECOVERY SYSTEMS FOR LAUNDRY SYSTEMS

FIELD

This disclosure relates to fluid recovery systems for laundry systems.

BACKGROUND

Astronauts exercise for about two hours every day, but there are no laundry capabilities up in space yet. About 2 to 4 lbs. (e.g., 20-40%) of the trash created every day on the international space station (ISS) is fabric based that can be rewashed and reused. It costs about $2000/lb to send something to the ISS, and is about ten times that or more to send something to the Moon, Mars, and beyond. Also, on long range missions, the resupply time can be about 1 to 2 years. About 160 pounds of clothing per crew member per year are launched to ISS currently.

Such conventional methods and systems have generally been considered satisfactory for their intended purpose. However, there is still a need in the art for improvements. The present disclosure provides a solution for this need.

SUMMARY

A fluid recovery system for a laundry system (e.g., of a spacecraft) can include a main line having an inlet configured to fluidly communicate with a washing volume within an agitation chamber to receive washing fluid from the agitation chamber, a vacuum source in fluid communication with the main line to provide a partial vacuum to the inlet to cause washing fluid in the washing volume to at least partially evaporate, and a condenser disposed on the main line downstream of inlet. The condenser can be configured to receive evaporated washing fluid and to condense water in the evaporated washing fluid. The system can include a separator downstream of the condenser configured to separate water and laundry effluent gas, wherein the separator includes a water recovery output configured to output water for reuse.

In certain embodiments, the system can include an inlet valve between the inlet and the condenser configured to allow or prevent flow of evaporated washing fluid from the inlet to the condenser. In certain embodiments, the system can include a filter between the inlet valve and the inlet. The filter can be configured to filter and/or defoam the washing fluid upstream of the condenser.

In certain embodiments, the condenser can be configured to fluidly connect to a spacecraft cooling network to cool the condenser. In certain embodiments, the separator can include a gas outlet configured to output the laundry effluent gas to a gas line.

In certain embodiments, the system can include a hydrophobic filter configured to prevent liquid water from flowing to the gas line. In certain embodiments, the system can include a regenerative mol sieve configured to be in fluid communication between the vacuum source and the separator to receive laundry effluent gas from the separator to dry the laundry effluent gas.

In certain embodiments, the regenerative mol sieve can be configured to be thermally treated to release water to be recovered for reuse. In certain embodiments, the system can include a mol sieve valve upstream of the mol sieve configured to allow or prevent the laundry effluent gas to flow to the mol sieve.

In certain embodiments, the system can include a bypass branch line upstream of the mol sieve valve configured to allow the laundry effluent gas to bypass the mol sieve. In certain embodiments, the system can include a bypass valve on the bypass branch line configured to allow or prevent laundry effluent gas on the bypass branch line.

In certain embodiments, the vacuum source can include a vacuum pump downstream of the mol sieve. In certain embodiments, the bypass branch line outlets downstream of the vacuum pump.

In certain embodiments, the system can include one or more outlet lines downstream of the separator. In certain embodiments, the one or more outlet lines can include a gas recovery outlet line configured to receive laundry effluent gas from the gas line for reuse of the laundry effluent gas. In certain embodiments, the system can include a gas recovery valve configured to allow or prevent laundry effluent gas on the gas recovery outlet line.

In certain embodiments, the one or more outlet lines can include a vacuum outlet line configured to be in fluid communication with an external vacuum, and a vacuum valve on the vacuum outlet line configured to allow or prevent laundry effluent gas on the vacuum line. In certain embodiments, the system can include a gas filter upstream of the one or more outlet lines configured to filter one or more gaseous components of the laundry effluent gas.

In certain embodiments, the system can include a heater configured to be in thermal communication with the agitation chamber to provide heat to the agitation chamber during partial vacuum to regulate the temperature of the agitation chamber. The system can include a control module configured to control any suitable component of the system for allowing water and/or gas recovery.

In accordance with at least one aspect of this disclosure, a laundry system can include an agitation chamber, and a motive system connected to the agitation chamber. The laundry system can include a fluid recovery system, e.g., as disclosed herein, operatively connected to the agitation chamber to be in fluid communication with a washing volume of the agitation chamber.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIGS. 9A, 9B, and 9C show experimental results using the embodiment of FIG. 1, wherein FIG. 9A shows a shirt stained with 5 ml of coffee, FIG. 9B shows the results of a baseline test wash using a centrifuge with 500 ml water and 15 ml of detergent, and FIG. 9C shows the results of a test using the embodiment of FIG. 1 with 500 ml water and 15 ml detergent.

DETAILED DESCRIPTION

Figure 1:
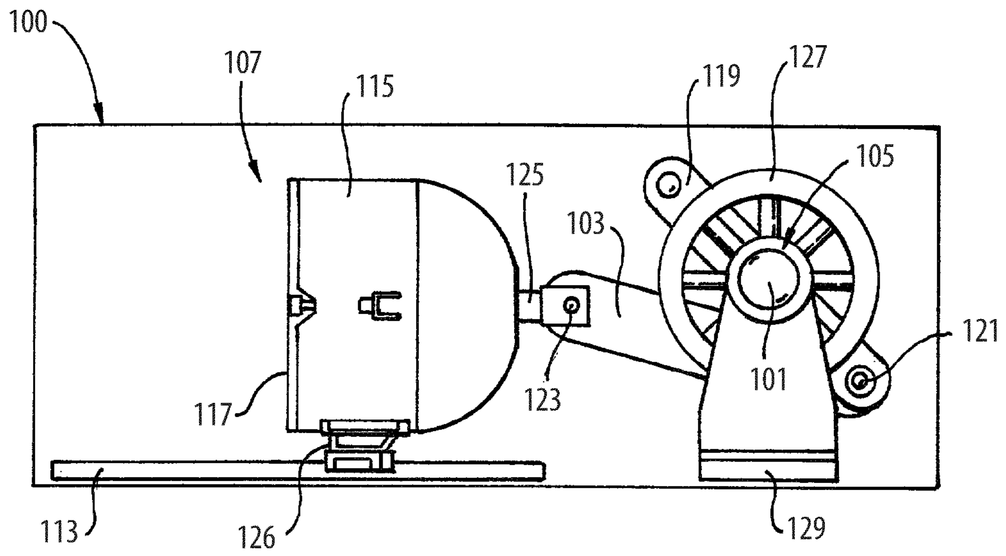
FIG. 1 is a side elevation view of an embodiment of a laundry system in accordance with this disclosure.

Reference will now be made to the drawings wherein like reference numerals identify similar structural features or aspects of the subject disclosure. For purposes of explanation and illustration, and not limitation, an illustrative view of an embodiment of a laundry system in accordance with the disclosure is shown in FIG. 1 and is designated generally by reference character 100. Other embodiments and/or aspects of this disclosure are shown in FIGS. 2-10. Certain embodiments described herein can be used to provide laundry capabilities to isolated missions (e.g., on spacecraft and/or planetary habitats).

Figure 2:
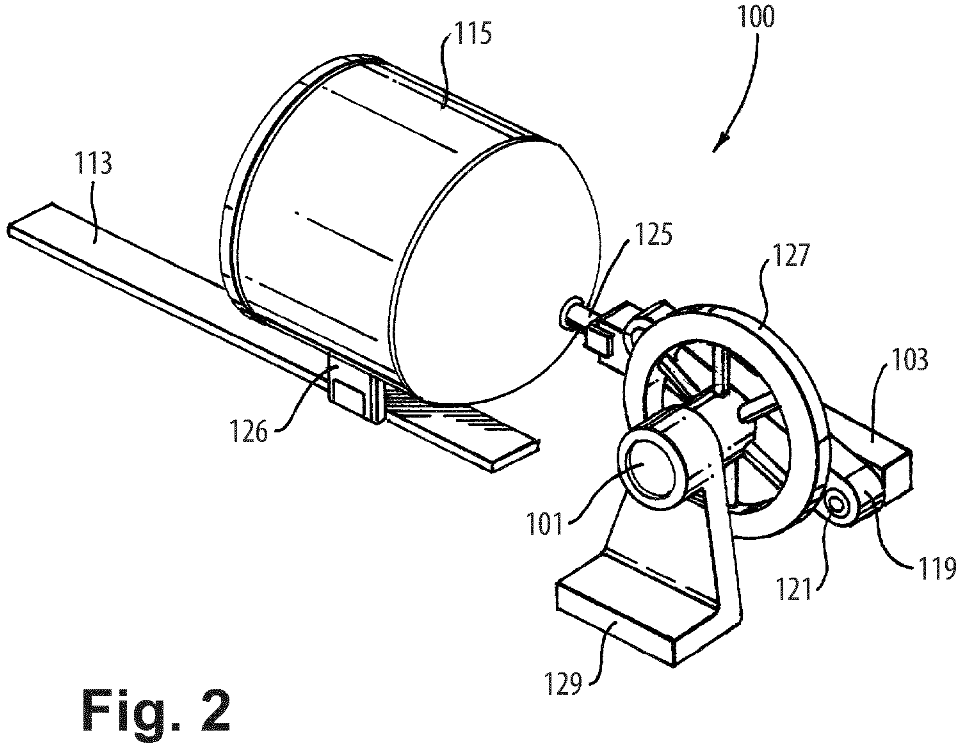
FIG. 2 is a perspective view of the embodiment of FIG. 1.
Figure 3:
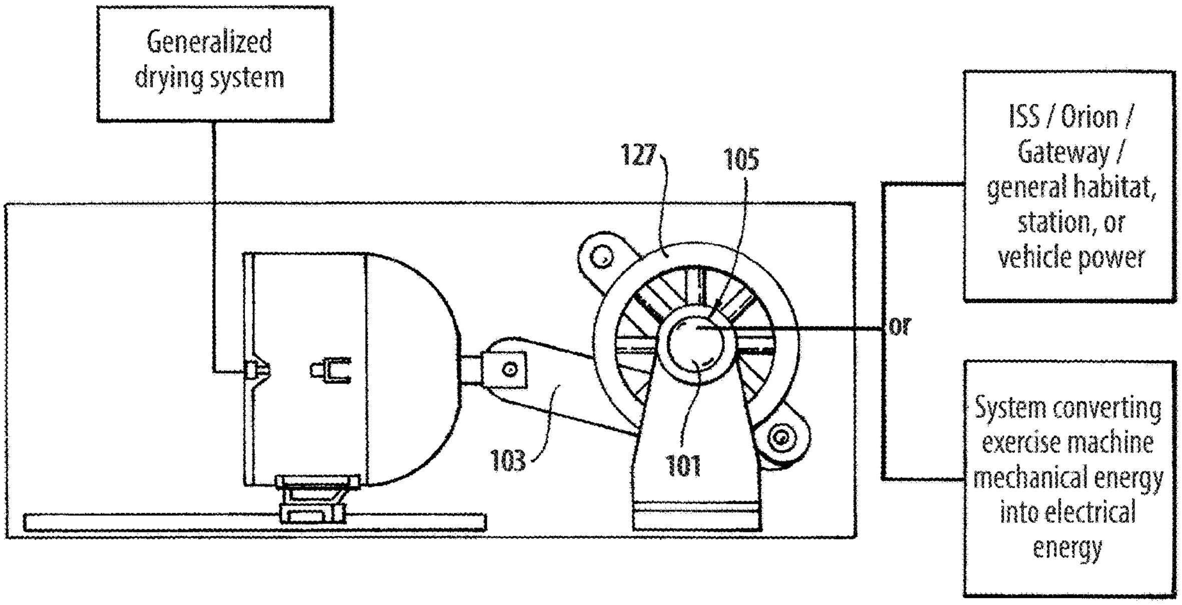
FIG. 3 is a side elevation view of the embodiment of FIG. 1, shown attached to one or more motive sources and having the agitation chamber connected to a drying system.

Referring to FIGS. 1-3, a laundry system 100 can include an input shaft 101, an output actuator 103, and a motion converter 105 connected between the input shaft 101 and the output actuator 103. The motion converter 105 can be configured to convert rotational motion of the input shaft 101 to linear motion of the output actuator 103. The system 100 can include a laundry agitation arrangement 107 connected to the output actuator 103 to be linearly actuated by the output actuator 103 to agitate laundry, for example.

Figure 4:
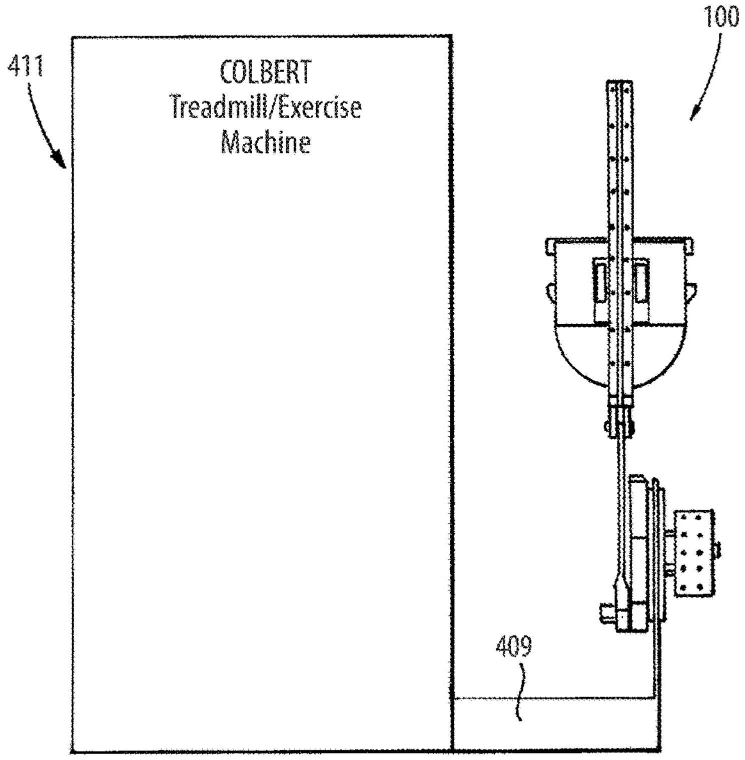
FIG. 4 is a schematic plan view of the embodiment of FIG. 1, shown attached to a treadmill exercise machine.
Figure 5:
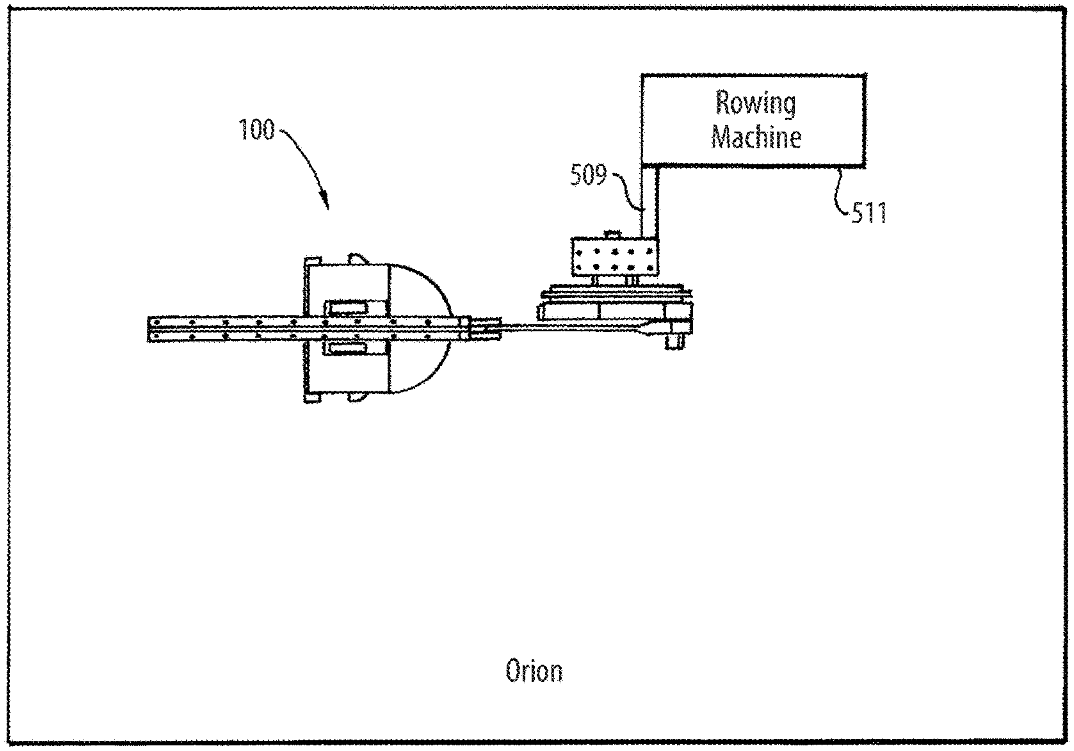
FIG. 5 is a schematic plan view of the embodiment of FIG. 1, shown attached to a rowing exercise machine.
Figure 6:
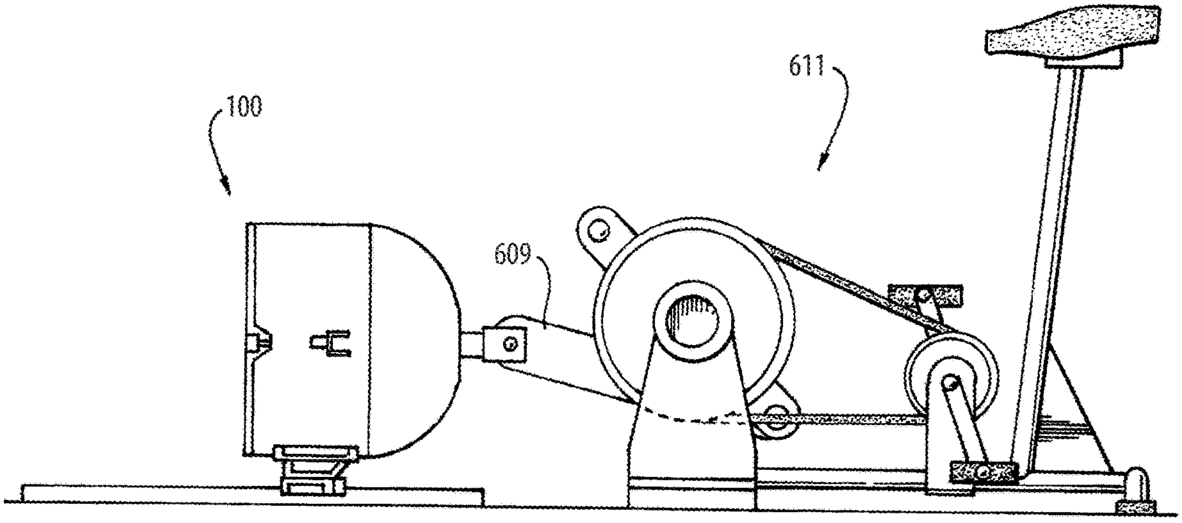
FIG. 6 is a schematic plan view of the embodiment of FIG. 1, shown attached to a cycle exercise machine and mounted to a floor.

Referring additionally to FIGS. 4, 5, and 6, the system 100 can further include an exercise machine coupling 409, 509, 609 (e.g., a shaft adapter and/or any other suitable connection to connect to an exercise machine) connected to or forming part of the input shaft 101 to couple the input shaft 101 to an exercise machine 411, 511, 611 to be rotated by the exercise machine 411, 511, 611. In certain embodiments, the system 100 can include the exercise machine 411, 511, 611. In certain embodiments, the exercise machine 411, 511, 611 can be a space station exercise machine (e.g., for use in space). The exercise machine 411, 511, 611 can be configured for any suitable spacecraft, planetary habitat, or other suitable isolated mission, for example.

In certain embodiments, the laundry agitation arrangement 107 can include a linear slide 113, and an agitation chamber 115 operatively connected to the linear slide 113 to be constrained to sliding motion. The agitation chamber 115 can be configured to receive and retain an item to be agitated (e.g., an article of clothing). In certain embodiments, the agitation chamber 115 can include a door 117 that is configured to be opened to access the interior volume of the agitation chamber 115. The door 117 can be latched and hinged, and/or otherwise removeably or moveably connected to a base portion of the agitation chamber 115. In certain embodiments, the agitation chamber 115 can be liquid sealed such that the agitation chamber 115 can contain water and detergent. In certain embodiments, an article of clothing can be placed within a sealed bag with water and detergent, and the sealed bag can be placed within the agitation chamber 115.

In certain embodiments, the motion converter 105 includes an inline slider crank mechanism (e.g., a two bar mechanism as shown). For example, in certain embodiments, the motion converter system 105 can include a first bar 119 fixed to the input shaft 101 to rotate with the input shaft 101. The output actuator 103 can be pinned to the first bar 119 at a first end (e.g., at pin 121) and pinned to the agitation chamber 115 at a second end (e.g., at pin 123, e.g., attached to a post 125 extending from the agitation chamber 115) such that rotation of the first bar 119 causes linear motion of the agitation chamber 115 on the linear slide 113. The agitation chamber 115 can include a skate 126 configured to slide and/or roll on the linear slide 113.

In certain embodiments, the motion converter system 105 can include a belt drive 127 (e.g., a wheel with a belt groove or other suitable belt interface) connected to or forming part of the input shaft 101 such that the input shaft 101 is configured to be belt driven (e.g., as shown in FIGS. 4, 5, and 6). The system 100 can include an anchor 129 configured to be fixed to a floor (or other suitable surface, e.g., a wall, a ceiling) and to allow the input shaft 101 to rotate therein (e.g., on a bearing, a race, directly, etc.).

Certain embodiments can convert rotary motion to linear motion such that an agitation chamber slides back and forth on a base and agitates clothes. In certain embodiments, the clothes can go in a bag that is placed inside the chamber. The bag and/or the chamber can have quick disconnects for pumping water in and out. In certain embodiments, the clothes can go directly in a sealed chamber with water and detergent. In certain embodiments, the chamber and/or bag can be attached to a drying system (e.g, as shown in FIG. 3) configured to remove water content from the chamber and/or the bag and/or provide heat thereto. For example, drying can include a partial vacuum system (e.g., utilizing space vacuum), and/or can include water recycling. Any suitable drying system and/or mechanism is contemplated herein.

Embodiments, e.g., as shown in FIG. 1, can agitate clothing by moving the chamber in a linear motion. In gravity environments, the clothing can rub on the base of chamber, for example. In micro-gravity environments the clothing can move throughout the whole chamber, for example. In certain embodiments, exercise machine mechanical energy can be converted into electrical energy to power a motor to drive the system 100. In certain embodiments, e.g., as shown in FIG. 3, the system 100 can be driven by spacecraft, general habitat, station, or vehicle power, or by electrical energy produced by an exercise machine.

However, in certain embodiments, exercise machine mechanical energy can be used to directly drive the laundry system 100 which can be more efficient. In certain embodiments, the system 100 can be configured to be optionally driven by either a direct mechanical drive, or by an electric motor powered by any suitable power source (e.g., as described above).

For example, embodiments can be powered by an exercise bike such as CEVIS or FERGO. Certain embodiments can be powered by a motor. Certain embodiments can be powered by a treadmill such as COLBERT via a connection to the main motor or a secondary shaft (e.g., which can be mechanical, electromechanical, etc.). Certain embodiments can be powered by a rowing exercise machine (e.g., on the Orion spacecraft) via a connection to the main shaft, or a flywheel, or a resistance pulley (e.g., which can be a shaft attachment, direct pulley and cable attachment for linear motion, electromechanical, etc.). Embodiments can include a shaft adapter that connects to the existing configuration of a treadmill (e.g., which can have a motor with two sprockets joined by a chain similar to a bicycle setup).

Figure 7:
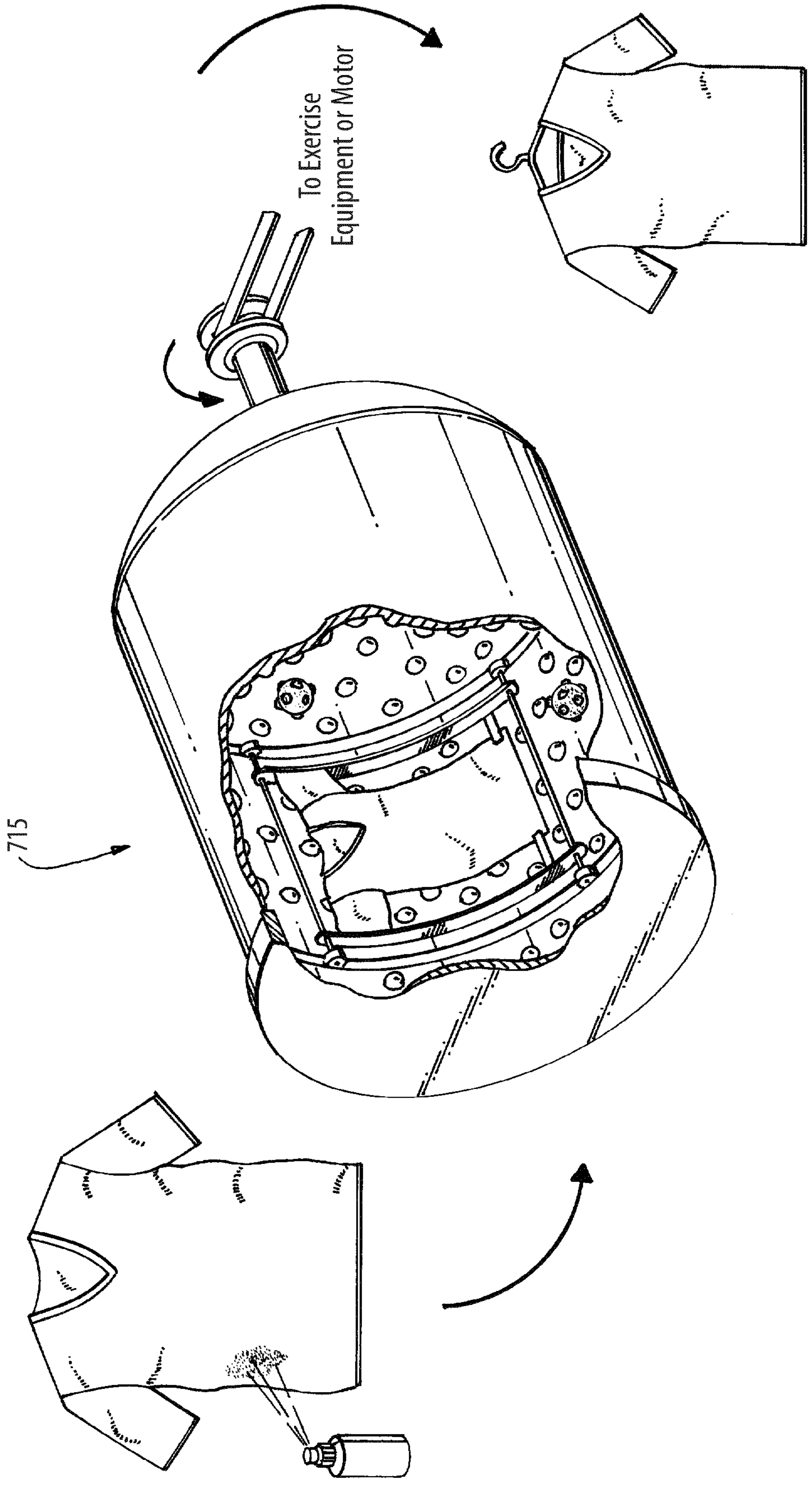
FIG. 7 is a schematic diagram of an embodiment of a rotational agitation chamber in accordance with this disclosure.

FIG. 7 shows a schematic diagram of an embodiment of a rotational agitation chamber 715 in accordance with this disclosure. The chamber 715 can include a spinning device with detached extrusions (e.g., bumpy balls within the chamber). The chamber 715 can comprise a single drum that spins with input motion (e.g., any suitable motive source disclosed hereinabove). The chamber 715 can include a bumpy inner diameter surface. As shown, an article of clothing can be stretched out and flat, and attached to inner wall of the drum. The article of clothing can be to a frame that allows agitation against an inner surface. The frame can include wheels (e.g., on a track of the inner wall of the drum) and can moves as the drum rotates. One or more bumpy balls can be placed in the chamber 715. In this regard, the article of clothing can be rubbed on both sides, on by the inner diameter of the drum, and one by the bumpy balls. In such a spinning embodiment, the chamber 715 can be directly driven in rotation by exercise equipment or a motor, e.g., via a belt drive, for example.

Figure 8A:
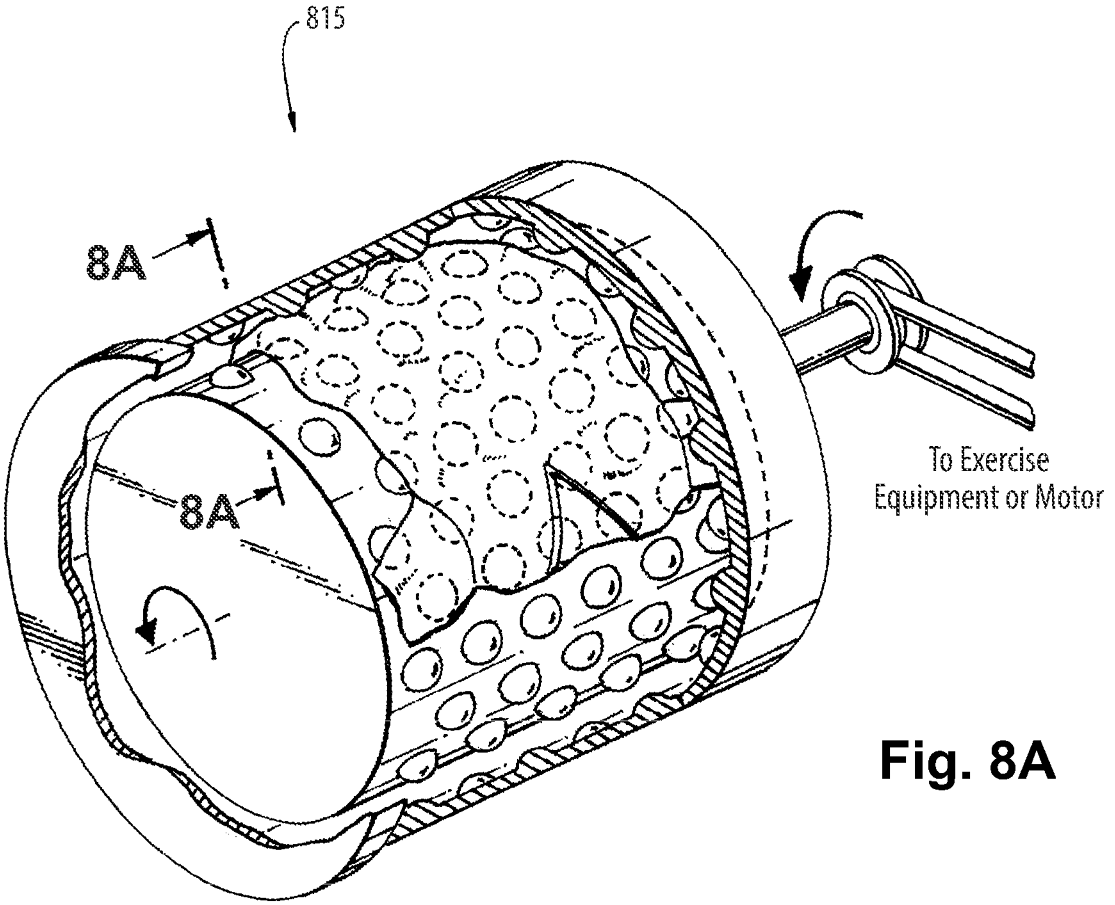
FIG. 8A is a schematic diagram of an embodiment of a rotational agitation chamber in accordance with this disclosure.
Figure 8B:
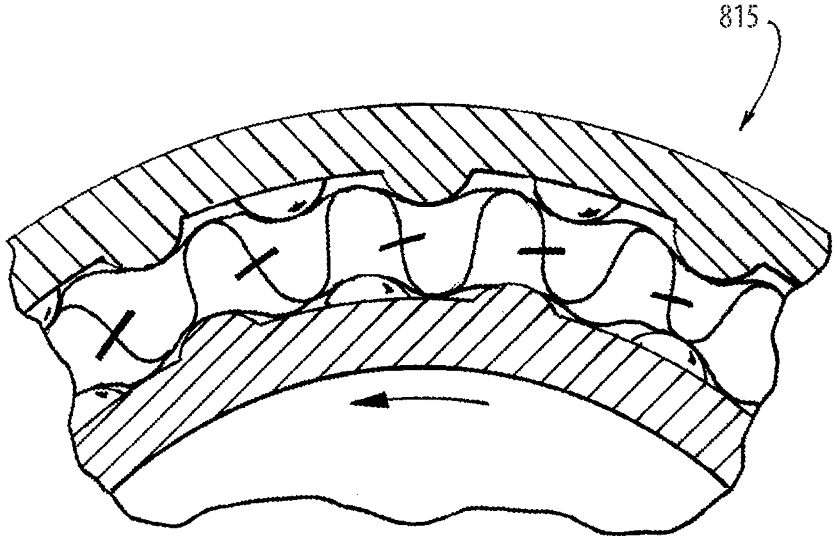
FIG. 8B is a cross-sectional view of the embodiment of FIG. 8A.

FIG. 8A is a schematic diagram of an embodiment of a rotational agitation chamber 815 in accordance with this disclosure. FIG. 8B is a cross-sectional view of the embodiment of FIG. 8A. The chamber 815 can include a drum within a drum. The articles of clothes can be placed between the inner and outer drum. Each drum can have bumpy surfaces (e.g., the inside of the outer drum, and the outside of the inner drum). In certain embodiments, only the inner drum can be actuated (e.g., rotated) and the outer drum can be stationary. The reverse is contemplated. As shown, the inner walls of the chamber can have agitating extrusions and the inner and outer drum can rotate while the clothing sits in between the two drums. In such a spinning embodiment, the chamber 815 can be directly driven in rotation by exercise equipment or a motor, e.g., via a belt drive, for example.

Figure 9A:
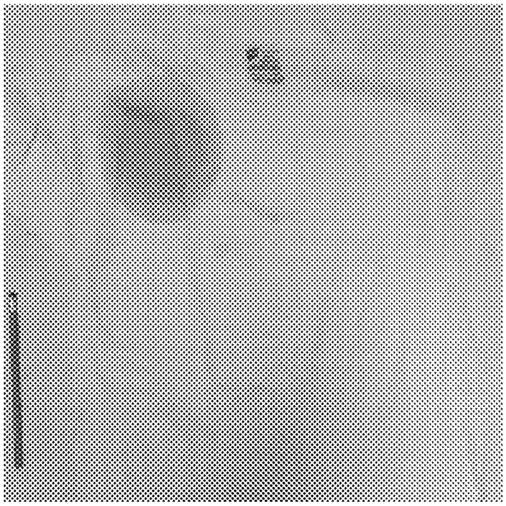
Figure 9B:
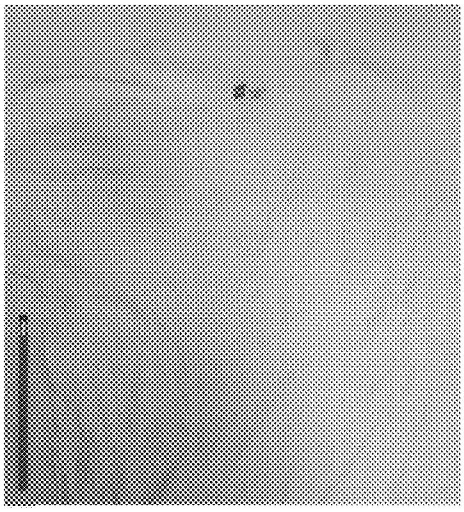
Figure 9C:
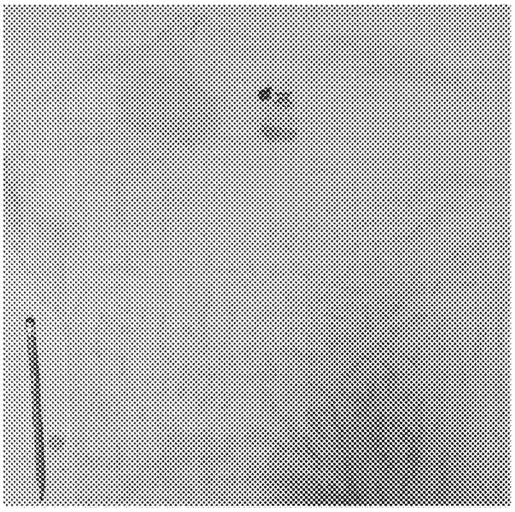

FIGS. 9A, 9B, and 9C show experimental results using the embodiment of FIG. 1. FIG. 9A shows a shirt stained with 5 ml of coffee. FIG. 9B shows the results of a baseline test wash using a centrifuge with 500 ml water and 15 ml of detergent. FIG. 9C shows the results of a test using the embodiment of FIG. 1 with 500 ml water and 15 ml detergent.

In accordance with at least one aspect of this disclosure, a method can include using a spacecraft exercise machine to manually power a spacecraft laundry system. In certain embodiments, using the spacecraft exercise machine can include converting rotational motion from the exercise machine into linear motion, and linearly actuating an agitator. In certain embodiments, the method can include adding water and an item of clothing to the linear agitator (e.g., in a bag or directly into a chamber of the agitator). In certain embodiments, the method can include removing the item of clothing from the linear agitator after agitation. The method can include any other suitable method(s) and/or portion(s) thereof.

In accordance with at least one aspect of this disclosure, a spacecraft can include a laundry system. The laundry system can be any suitable embodiment of a laundry system disclosed herein, e.g., as described above. The spacecraft can include an exercise machine, for example, and the laundry system can be connected to the exercise machine to be driven by the exercise machine.

Embodiments can reduce upmass and increase astronaut comfort. Embodiments can include a small (e.g., single article of clothing volume), mechanical, low-power, and low-water-usage washing machine that can interface with an exercise bike (or other equipment) to effectively multitask the required exercise and laundry. The washer can be configured to wash at least one medium-size t-shirt in less than 30 minutes, can use less than 500 mL of water per wash, can be configured to recover more than 90% of water usage (e.g., with a water recovery system), can use less than 50 mL of detergent, and can produce a shirt that is at least 80% clean, for example. Embodiments can be used in microgravity environments or in environments that have little-to-no power or water. Embodiments can be used as a washer and/or dryer, and can be primarily powered through exercise equipment. Embodiments can be capable of use in gravity and micro-gravity, for example.

Embodiments of a method for using an embodiment, e.g., as shown in FIG. 1, can include opening the door (5 s), loading clothes into drum (15 s), closing the door (5 s), adding water and detergent (e.g., automated=5 s, manual=30-60 s), starting a wash cycle (e.g., 10-20 min), starting a dry cycle (e.g., vacuum, centrifugal, wrung, bag) (0-10 min), and hanging clothes up to dry completely (e.g., with ECLSS).

Embodiments can weigh less than 10 lbs, can be able to wash at least 1 medium size cotton t-shirt in less than 30 min, can have low volume (e.g., double EXPRESS rack locker dimensions (21.45×21.10×17.34 inches)), can use minimum power (e.g., less than 500 W), minimum water (e.g., less than 1 L of water per run), and can use minimum detergent (e.g., less than 50 ml). Embodiments can enable water recovery of greater than 90%. Embodiments can provide the ability to produce about an 80% clean cotton t-shirt or higher cleanliness.

Embodiments can be 3D-printed out of glass resin. Embodiments can use a bottle nipple for loading water and premix. Embodiments can be lightweight and durable, e.g., made using aluminum material which emits no outgas and doesn't corrode. For draining water, dirty/soapy water can be put into a spacecraft condensate system. A second rinse cycle liquid can become the liquid solvent for the next wash. Certain embodiments can utilize centrifugal drying.

Figure 10:
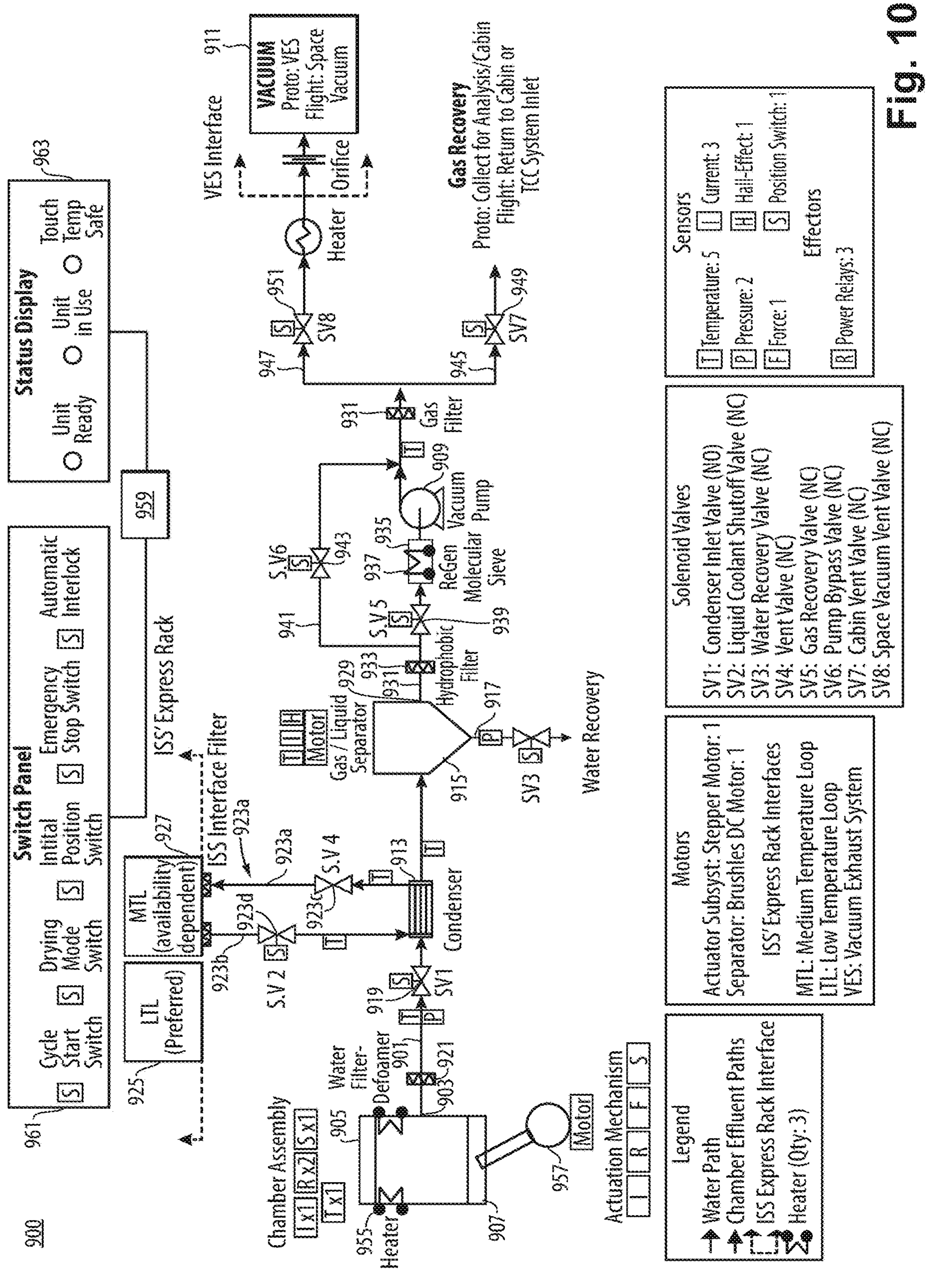
FIG. 10 is a schematic diagram of an embodiment of a fluid recovery system in accordance with this disclosure.

Referring to FIG. 10, a fluid recovery system 900 for a laundry system (e.g., of a spacecraft) can include a main line 901 having an inlet 903 configured to fluidly communicate with a washing volume 905 within an agitation chamber 907 to receive washing fluid from the agitation chamber 907. The system 900 can include a vacuum source (e.g., pump 909 and/or vacuum outlet 911) in fluid communication with the main line 901 to provide a partial vacuum to the inlet 903 to cause washing fluid in the washing volume 905 to at least partially evaporate.

The system 900 can also include a condenser 913 disposed on the main line 101 downstream of inlet 103. The condenser 913 can be configured to receive evaporated washing fluid and to condense water in the evaporated washing fluid. The system 900 can include a separator 915 (e.g., a motorized gas/liquid separator) downstream of the condenser 913 configured to separate water and laundry effluent gas. The separator 915 can include a water recovery output 917 configured to output water for reuse (e.g., collection for analysis, storage, drinking water, a spacecraft water supply).

In certain embodiments, the system 900 can include an inlet valve 919 (e.g., a solenoid valve) between the inlet 903 and the condenser 913 configured to allow or prevent flow of evaporated washing fluid from the inlet 903 to the condenser 913. In certain embodiments, the system 900 can include a filter 921 between the inlet valve 919 and the inlet 913. The filter 921 can be configured to filter and/or defoam the washing fluid upstream of the condenser 913.

In certain embodiments, the condenser 913 can be configured to fluidly connect to a spacecraft cooling network 923 to cool the condenser 913 (e.g., a low temperature loop (LTL) 925 or a medium temperature loop (MTL) 927 of the international space station (ISS), for example). As shown, the cooling network 923 can include a cooling loop formed by a first coolant line 923*a* and a second line 923*b* in fluid communication with the condenser 913. Each line 923*a*, 923*b* can include a valve 923*c*, 923*d* (e.g., a solenoid valve) to control coolant flow on each line 923*a*, 923*b*. Any other suitable cooling source for any suitable application is contemplated herein. In certain embodiments, the system 900 can include a stand-alone cooling system associated with the condenser 913.

In certain embodiments, the separator 915 can include a gas outlet 929 configured to output the laundry effluent gas to a gas line 931. In certain embodiments, the system 900 can include a hydrophobic filter 933 configured to prevent liquid water from flowing to the gas line 931 (e.g., any remaining liquid water content that may escape the separator 915). In certain embodiments, the system 900 can include a regenerative mol sieve 935 configured to be in fluid communication between the vacuum source (e.g., pump 909) and the separator 915 to receive laundry effluent gas from the separator 915 to dry the laundry effluent gas.

In certain embodiments, the regenerative mol sieve 935 can be configured to be thermally treated (e.g., via a heater device 937) to release water to be recovered for reuse (e.g., drained to any suitable location, e.g., to water recover output 917). In certain embodiments, the system 900 can include a mol sieve valve 939 (e.g., a solenoid valve) upstream of the mol sieve 935 configured to allow or prevent the laundry effluent gas to flow to the mol sieve 935.

In certain embodiments, the system 900 can include a bypass branch line 941 upstream of the mol sieve valve 939 (and/or the mol sieve 935) configured to allow the laundry effluent gas to bypass the mol sieve 935. In certain embodiments, the system 900 can include a bypass valve 943 on the bypass branch line 941 configured to allow or prevent laundry effluent gas on the bypass branch line 941.

In certain embodiments, the vacuum source can be or include a vacuum pump 909 downstream of the mol sieve 935. In certain embodiments, the bypass branch line 941 outlets downstream of the vacuum pump 909, e.g., as shown. In certain embodiments, the system 900 can include one or more outlet lines 945, 947 downstream of the separator 915 (e.g., downstream of the vacuum pump 909 and the bypass branch line 941). In certain embodiments, the one or more outlet lines 945, 947 can include a gas recovery outlet line 945 configured to receive laundry effluent gas from the gas line 931 for reuse of the laundry effluent gas (e.g., collection, analysis, return to cabin, etc.). In certain embodiments, the system 900 can include a gas recovery valve 949 configured to allow or prevent laundry effluent gas on the gas recovery outlet line 945.

In certain embodiments, the one or more outlet lines 945, 947 can include a vacuum outlet line 947 configured to be in fluid communication with an external vacuum 911 (e.g., a space vacuum, a spacecraft vacuum source, a vacuum exhaust system (VES)). The system 900 can include a vacuum valve 951 on the vacuum outlet line 947 configured to allow or prevent laundry effluent gas on the vacuum line 947. In certain embodiments, the system 900 can include a gas filter 953 upstream of the one or more outlet lines 947, 945 configured to filter one or more gaseous components of the laundry effluent gas.

In certain embodiments, the system 900 can include a heater 955 configured to be in thermal communication with the agitation chamber 907 to provide heat to the agitation chamber 907 during partial vacuum to regulate the temperature of the agitation chamber 907 (e.g., to about 20 degrees C.). Any suitable location for the heater 955 (e.g., external to the agitation chamber 907, is contemplated herein. The agitation chamber 907 can be any suitable agitation chamber disclosed herein, e.g., as described above with respect to FIGS. 1-8B. Any suitable motive system (e.g., a motor 957, and/or an exercise machine connection) to agitate the agitation chamber 907 is contemplated herein.

Any of the valves, pumps, motors, cooling systems, heaters, and other components can be controllable by a control module 959. In certain embodiments, the system 900 can include a control module 959 operatively connected to one or more (e.g., each) of the controllable components in system 900 configured to control any suitable component of the system 900 (e.g., any and/or all valves, heaters, cooling systems, motors, pumps, etc.) for allowing water and/or gas recovery (e.g., and preventing damage to the system or a safety hazard). Connections to each controllable component are not shown for clarity.

The system 900 can also include one or more sensors (e.g., pressure sensors P, temperature sensors T, Hall effect sensors H, current sensors I, force sensors F, position switch sensors S) for providing information about one or more portions of system 900. For example, the control module 959 can be configured to control the one or more controllable components based on the sensor information. For example, the control module 959 can be configured to regulate pressure drop produced by the vacuum pump 909, and/or select whether to bypass the mol sieve 937, and/or activate the heater 955 to prevent freezing or excessively cold temperatures in the agitation chamber 907. The control module 959 can be configured to receive one or more manual commands from a switch panel 961, e.g., as shown, and/or to indicate one or more statuses on a display 963 (e.g., as shown).

In accordance with at least one aspect of this disclosure, a laundry system (e.g., 100 as described above) can include an agitation chamber 907, and a motive system (e.g., an electric motor 957) connected to the agitation chamber 907. The laundry system can include a fluid recovery system, e.g., the system 900 as disclosed herein, operatively connected to the agitation chamber 907 to be in fluid communication with a washing volume of the agitation chamber 907.

Embodiments include an automated system for adding water and/or recycling/drying using partial vacuum to evaporate, collect, and recycle water. Embodiments can be applied to space travel applications, and/or to any other suitable application.

Embodiments can include a washing chamber assembly powered by any suitable motive force. Embodiments can include a heater on the outside of the chamber or elsewhere to use very little power and to keep the chamber at a target temperature (e.g., 20 degrees C.) as the reduced pressure will reduce temperature. Embodiments can include a vacuum pump that pulls a partial vacuum to boil off water content inside washing chamber (e.g., 0.25 psia target vacuum). Embodiments can include an optional water filter/defoamer to remove any residual detergent foam or other non-steam/water contaminants. Embodiments can include one or more valves to control of different stages and/or functions of the system. Embodiments can include a condenser that condenses water, e.g., using a cooling source set to a temperature to condense water at the operating pressure. Downstream of condenser can be liquid water mixed with other laundry effluent gas. Embodiments can include a gas/liquid separator that separates water and other gasses to allow for water recovery for any suitable use. Embodiments can include a hydrophobic filter downstream of the separator to prevent any liquid water from getting into the gas line. Downstream of the hydrophobic filter can be purely gas. Embodiments can include a regenerative molecular sieve which can sieve the gas to dry it out, and can regenerate usable water from the mol sieve. The remaining gas can be routed toward any suitable reuse or waste location desired. Embodiments can include a bypass line and valve to allow gas to bypass the mol sieve if no sieve is desired. Remainder gas can be filtered and then collected/reused, and/or wasted.

Certain embodiments can include any suitable computer hardware and/or software. Embodiments can include any suitable computer hardware and/or software module(s) to perform any suitable function (e.g., as disclosed herein).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fluid recovery system for a laundry system, comprising:

- a main line having an inlet configured to fluidly communicate with a washing volume within an agitation chamber to receive washing fluid from the agitation chamber;
- a vacuum source in fluid communication with the main line to provide a partial vacuum to the inlet to cause washing fluid in the washing volume to at least partially evaporate;
- a condenser disposed on the main line downstream of the inlet, the condenser configured to receive evaporated washing fluid and to condense water in the evaporated washing fluid;
- a separator downstream of the condenser configured to separate water and laundry effluent gas, wherein the separator includes a water recovery output configured to output water for reuse, wherein the separator includes a gas outlet configured to output the laundry effluent gas to a gas line;
- a regenerative mol sieve configured to be in fluid communication between the vacuum source and the separator to receive laundry effluent gas from the separator to dry the laundry effluent gas.

2. The system of claim 1, further comprising an inlet valve between the inlet and the condenser configured to allow or prevent flow of evaporated washing fluid from the inlet to the condenser.

3. The system of claim 2, further comprising a filter between the inlet valve and the inlet, the filter configured to filter and/or defoam the washing fluid upstream of the condenser.

4. The system of claim 1, wherein the condenser is configured to fluidly connect to a spacecraft cooling network to cool the condenser.

5. The system of claim 1, further comprising a hydrophobic filter configured to prevent liquid water from flowing to the gas line.

6. The system of claim 1, wherein the regenerative mol sieve is configured to be thermally treated to release water to be recovered for reuse.

7. The system of claim 1, further comprising a mol sieve valve upstream of the mol sieve configured to allow or prevent the laundry effluent gas to flow to the mol sieve.

8. The system of claim 7, further comprising a bypass branch line upstream of the mol sieve valve configured to allow the laundry effluent gas to bypass the mol sieve.

9. The system of claim 8, further comprising a bypass valve on the bypass branch line configured to allow or prevent laundry effluent gas on the bypass branch line.

10. The system of claim 9, wherein the vacuum source includes a vacuum pump downstream of the mol sieve.

11. The system of claim 10, wherein the bypass branch line outlets downstream of the vacuum pump.

12. The system of claim 1, further comprising one or more outlet lines downstream of the separator.

13. The system of claim 12, wherein the one or more outlet lines include a gas recovery outlet line configured to receive laundry effluent gas from the gas line for reuse of the laundry effluent gas.

14. The system of claim 13, further comprising a gas recovery valve configured to allow or prevent laundry effluent gas on the gas recovery outlet line.

15. The system of claim 12, the one or more outlet lines include a vacuum outlet line configured to be in fluid communication with an external vacuum, and a vacuum valve on the vacuum outlet line configured to allow or prevent laundry effluent gas on the vacuum line.

16. The system of claim 14, further comprising a gas filter upstream of the one or more outlet lines configured to filter one or more gaseous components of the laundry effluent gas.

17. The system of claim 1, further comprising a heater configured to be in thermal communication with the agitation chamber to provide heat to the agitation chamber during partial vacuum to regulate the temperature of the agitation chamber.

18. A laundry system, comprising:

- an agitation chamber;
- a motive system connected to the agitation chamber; and
  - the fluid recovery system of claim 1 operatively connected to the agitation chamber to be in fluid communication with a washing volume of the agitation chamber.

* * * * *